US009989093B2

(12) United States Patent
Boeck

(10) Patent No.: US 9,989,093 B2
(45) Date of Patent: Jun. 5, 2018

(54) ROLLER BEARINGS, IN PARTICULAR NEEDLE BEARINGS, FOR ARRANGING ON A PIVOT PIN OF A VARIABLE GUIDE VANE OF A TURBOMACHINE

(71) Applicant: MTU Aero Engines AG, Munich (DE)

(72) Inventor: Alexander Boeck, Kottgeisering (DE)

(73) Assignee: MTU Aero Engines AG, Munich (DE)

( * ) Notice: Subject to any disclaimer, the term of this patent is extended or adjusted under 35 U.S.C. 154(b) by 313 days.

(21) Appl. No.: 14/821,295

(22) Filed: Aug. 7, 2015

(65) Prior Publication Data
US 2016/0040713 A1    Feb. 11, 2016

(30) Foreign Application Priority Data

Aug. 7, 2014   (DE) .................. 10 2014 215 623

(51) Int. Cl.
*F01D 17/16*    (2006.01)
*F16C 33/34*    (2006.01)
(Continued)

(52) U.S. Cl.
CPC .............. *F16C 33/34* (2013.01); *F01D 17/16* (2013.01); *F01D 17/162* (2013.01); *F01D 25/16* (2013.01);
(Continued)

(58) Field of Classification Search
CPC ........ F16C 33/34; F16C 33/36; F16C 19/525; F16C 19/46; F16C 19/463; F16C 27/04;
(Continued)

(56) References Cited

U.S. PATENT DOCUMENTS 1,459,974 A    6/1923  Critz, Jr.
1,480,293 A  *  1/1924  Norris .................. F16C 9/04
                                                384/579
(Continued)

FOREIGN PATENT DOCUMENTS

DE            1 931 044 A      3/1971
DE      10 2006 039 365 A1    3/2008
(Continued)

OTHER PUBLICATIONS

European Search Report issued in European counterpart application No. 15178555.7-1610 dated Dec. 10, 2015, with Statement of Relevancy (Six (6) pages).
(Continued)

*Primary Examiner* — Richard Edgar
(74) *Attorney, Agent, or Firm* — Crowell & Moring LLP

(57) ABSTRACT

A roller bearing, particularly a needle bearing, for arranging on a pivot pin of a variable guide vane of a turbomachine, is disclosed. The roller bearing includes at least one radially elastic needle which has two opposing end regions and at least one roller region arranged between the end regions and constructed in a cross-sectionally thickened manner. The end regions roll off at associated raceways of a bearing housing of the roller bearing and the roller region is arranged in the region of an associated groove of the bearing housing. A variable guide vane with at least one such roller bearing, a housing of a turbomachine with such a guide vane, as well as a turbomachine, is also disclosed.

15 Claims, 4 Drawing Sheets

(51) Int. Cl.
*F16C 19/46* (2006.01)
*F16C 33/36* (2006.01)
*F01D 25/16* (2006.01)
*F16C 27/04* (2006.01)
*F16C 19/52* (2006.01)

(52) U.S. Cl.
CPC ............ *F16C 19/46* (2013.01); *F16C 19/463* (2013.01); *F16C 27/04* (2013.01); *F16C 33/36* (2013.01); *F05D 2240/54* (2013.01); *F16C 19/525* (2013.01)

(58) Field of Classification Search
CPC ........ F01D 17/16; F01D 17/162; F01D 25/16; F05D 2240/54
See application file for complete search history.

(56) References Cited

U.S. PATENT DOCUMENTS

| | | | | |
|---|---|---|---|---|
| 2,884,288 A * | 4/1959 | Herrmann | ............... | F16C 19/46 384/580 |
| 3,674,377 A | 7/1972 | Trappmann | | |
| 4,997,293 A * | 3/1991 | Ono | ............... | F16C 35/077 384/476 |
| 5,672,047 A * | 9/1997 | Birkholz | ............... | F01D 9/065 415/160 |
| 5,836,701 A | 11/1998 | Vranish | | |
| 7,112,040 B2 * | 9/2006 | Debeneix | ............... | F01D 17/16 384/619 |
| 7,255,483 B1 * | 8/2007 | Vranish | ............... | F16C 19/36 384/551 |

FOREIGN PATENT DOCUMENTS

| | | |
|---|---|---|
| FR | 619 443 A | 4/1927 |
| FR | 982 401 A | 6/1951 |
| JP | 2000-179555 A | 6/2000 |
| WO | WO 01/25645 A2 | 4/2001 |

OTHER PUBLICATIONS

German Office Action issued in German counterpart application No. 10 2014 215 623.8 dated Sep. 8, 2017 (Six (6) pages).

* cited by examiner

ROLLER BEARINGS, IN PARTICULAR NEEDLE BEARINGS, FOR ARRANGING ON A PIVOT PIN OF A VARIABLE GUIDE VANE OF A TURBOMACHINE

This application claims the priority of German Patent Application No. DE 10 2014 215 623.8, filed Aug. 7, 2014, the disclosure of which is expressly incorporated by reference herein.

BACKGROUND AND SUMMARY OF THE INVENTION

The invention relates to a roller bearing, particularly a needle bearing, for arranging on a pivot pin of a variable guide vane of a turbomachine. Furthermore, the invention relates to a variable guide vane, a housing of a turbomachine, as well as a turbomachine.

Variable guide vanes in a turbomachine, for example in a turbine of an aircraft engine, enable one to modify the intake capability of this turbomachine. In this way, the turbomachine can be better adjusted for various operating points, whereby the efficiency increases and the fuel consumption is decreased for example.

A problem for example in airplane turbines is the mounting of the variable guide vanes, whose leak-tightness must be assured for approximately 25,000 flight cycles. It is known from DE 1931044 A for example to rotatably mount pivot pins of adjustable guide vanes by a combination of a roller bearing and a slide or ball bearing on the housing of a turbomachine.

Due to the high temperatures and temperature gradients during operation of the associated turbomachine, such slide bearings tend to "seize" after only relatively few cycles, while the roller bearings often distort and thereby damage or even destroy themselves. This can only be compensated for with a comparatively large bearing play, which, however, results in high leakage rates and correspondingly low efficiencies.

The object of the present invention is to provide a bearing for variable guide vanes of turbomachines, which ensures a precise guiding of an associated shaft even at large temperature fluctuations. Additional objects of the invention consist of providing a guide vane with such a bearing, a housing of a turbomachine with correspondingly mounted guide vanes as well as a turbomachine with such mounted guide vanes.

A bearing according to the invention, which ensures precise guiding of the associated shaft even at large temperature fluctuations, is according to a first aspect of the invention constructed as a roller bearing, particularly a needle bearing, and includes at least one radially elastic needle that has two opposing end regions, and at least one roller region arranged between the end regions and constructed in a cross-sectionally thickened manner. The end regions thereby roll off to associated raceways of a bearing housing of the roller bearing, while the roller region is arranged in the region of an associated groove of the bearing housing. A radially elastic bearing is hereby created, which by an elastic deformation of the needle can compensate for large temperature differences and tolerances between the bearing housing, which can also be described as a bearing bushing, and an associated shaft, particularly a pivot pin of a guide vane. By the precise guiding of an associated shaft, other elements, such as shaft seals for example are also protected and their leak-tightness is maintained. The elasticity and radial deformability of the needle is achieved on the one hand by the needle resting on or contacting the bearing housing, or on the other running along a groove of the bearing housing so that the roller region of the needle can move into or out of this groove under the elastic deformation of the needle. By the elastic yielding capability of the needle, an at least extensive play-free mounting of an associated guide vane is ensured in all operating points and also during transient transitions of an associated turbomachine, in which particularly large temperature variances occur. In addition, there is only a very slight bearing wear without "seizing" by the mainly occurring roll movements of the needle. The roller bearing according to the invention therefore allows a substantially more leak-tight and more durable mounting of guide vanes than previous bearings or bearing combinations.

In an advantageous embodiment of the invention, the groove is constructed in such a manner that at least one roller region does not contact the bearing housing given a needle under no load. In other words, it is provided that between a wall of the groove and the roller region of the needle, a predetermined clearance exists in the event of a needle that is not under any force or not deformed. It is hereby ensured that the needle deforms inwardly into the groove only in the event of being subjected to tension or force as the case may be or temperature, until the roller region lies against the wall of the groove. By the clearance between the wall of the groove and the roller region given a no-load needle, the maximum permissible deformation of the needle can be adjusted in a particularly simple manner.

Additional advantages emerge when at least one roller region is constructed in the middle of the needle. A particularly symmetrical force distribution across the needle is hereby achieved in the event of a radial bending of the needle, whereby the durability of the roller bearing is further increased.

In an additional advantageous embodiment of the invention, an axial length of the roller region is between 5% and 50% of the total length of the needle. In other words, the roller region has an axial elongation that corresponds to 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50% of the axial total elongation of the needle. The contact surface, located between the end regions, of the needle can hereby be optimally adapted to the respective conditions and requirements. Alternatively or additionally, it is provided according to the invention that an average cross-sectional thickness of the roller region is between 105% and 180% of the average cross-sectional thickness of the needle. In other words, it is provided that the cross-section of the roller region is on average 105%, 106%, 107%, 108%, 109%, 110%, 111%, 112%, 113%, 114%, 115%, 116%, 117%, 118%, 119% 120%, 121%, 122%, 123%, 124%, 125%, 126%, 127%, 128%, 129%, 130%, 131%, 132%, 133%, 134%, 135%, 136%, 137%, 138%, 139%, 140%, 141%, 142%, 143%, 144%, 145%, 146%, 147%, 148%, 149%, 150%, 151%, 152%, 153%, 154%, 155%, 156%, 157%, 158%, 159%, 160%, 161%, 162%, 163%, 164%, 165%, 166%, 167%, 168%, 169%, 170%, 171%, 172%, 173%, 174%, 175%, 176%, 177%, 178%, 179% or 180% of the average cross-sectional thickness of the needle. The average cross-sectional thickness of the needle thereby refers to the average cross-sectional thickness of those regions of the needle that are not part of the roller region. One can hereby adjust the bending behavior on the one hand and on the other the maximum permissible bending of the needle.

Additional advantages emerge by the roller region being constructed at least essentially in a cylindrical or spherical manner. This allows for a simple adaptation of the roller surface of the needle to the geometric design of the groove of the bearing housing.

In another embodiment of the invention, it may thereby be provided that the needle has at least two roller regions that are spaced apart from one another. The needle hereby has between its ends two or more contact surfaces, wherein a particularly precise adjustability of the bending behavior of the needle is made possible. The at least two roller regions can thereby basically have the same cross-sectional thicknesses or variable cross-sectional thickness and/or the same or different cross-sectional geometries.

In another advantageous embodiment of the invention, the needle is guided into a cage of the bearing housing, the cage limiting a relative mobility of the needle in relation to the bearing housing. In this way, the needle is guided precisely into the bearing housing and secured against falling out.

Additional advantages emerge when the bearing housing is assigned an insulation element for heat insulation purposes. The service life of the roller bearing can hereby also be advantageously increased, particularly when used in turbomachines with high temperature loads and large temperature fluctuations. For example, the insulation element can partially or entirely surround the bearing housing.

A particularly reliable mounting is achieved in another embodiment of the invention when the bearing housing includes a needle collar with multiple needles arranged in a ring-shaped manner.

A second aspect of the invention relates to a guide vane of a turbomachine, with a pivot pin on which at least one roller bearing is arranged. In doing so, it is provided according to the invention that the thereby utilized roller bearing is constructed according to the first aspect of the invention. The features resulting from this and their advantages are disclosed in the descriptions of the first aspect of the invention, wherein advantageous embodiments of the first aspect of the invention are to be considered as advantageous embodiments of the second aspect of the invention.

A third aspect of the invention relates to a housing for a turbomachine, wherein the housing includes at least one variable guide vane, which has a pivot pin that is arranged rotatably on the housing and at least one roller bearing. In doing so, it is provided according to the invention that the roller bearing utilized here is constructed according to the first aspect of the invention. The features resulting from this and their advantages are disclosed in the descriptions of the first aspect of the invention, wherein advantageous embodiments of the first aspect of the invention are to be considered as advantageous embodiments of the second aspect of the invention.

In an advantageous embodiment of the invention, it is provided that at least two roller bearings are arranged in the axial direction of the pivot pin above each other on the pivot pin of the at least one guide vane. In this way, a mounting of the guide vane able to withstand particularly high mechanical and thermal loads is created, since two or more smaller roller bearings with smaller tolerances are used instead of a comparatively long roller bearing with correspondingly higher tolerances.

Additional advantages are that the pivot pin of the at least one guide vane is sealed by a shaft seal, particularly by a stuffing box, relative to the housing. In this way, leak-tightness of the entire support of the guide vane is achieved. Due to the precise mounting of the guide vane by the roller bearing according to the invention, it is also ensured that only very few asymmetric leakage gaps occur in the shaft seal, whereby their sealing effect is also maintained across all operating points of an associated turbomachine.

In another advantageous embodiment of the invention, it is provided that the housing includes a guide vane cascade with at least two variable guide vanes. Such adjustable guide vane cascades ensure additionally increased efficiency of the associated turbomachine.

A fourth aspect of the invention relates to a turbomachine, particularly an aircraft engine, which has at least one guide vane according to the second aspect of the invention and/or a housing according to the third aspect of the invention. The features resulting from this and their advantages are disclosed in the descriptions of the second and third aspects of the invention respectively, wherein advantageous embodiments of the second and third aspects of the invention are to be considered as advantageous embodiments of the fourth aspect of the invention.

Additional features of the invention emerge from the following description as well as the drawings. The features and feature combinations precedingly described in the description as well as the features and feature combinations subsequently mentioned in the embodiments are not only usable in the respectively mentioned combination, but also in other combinations, without departing from the scope of the invention.

DETAILED DESCRIPTION OF THE DRAWINGS

Figure 1:
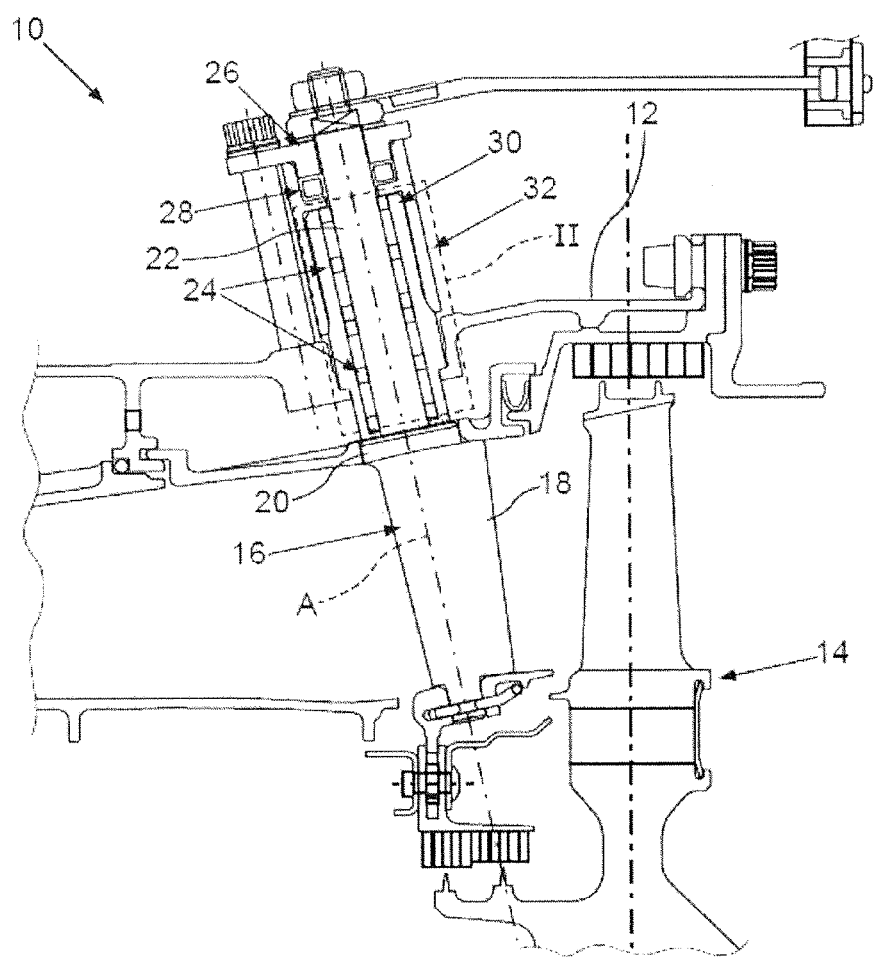
FIG. 1 depicts a schematic longitudinal section through a turbomachine.

FIG. 1 depicts a schematic longitudinal cross-section through a turbomachine 10 constructed here as an airplane engine. The basic structure of turbomachine 10 is thereby known from prior art. Accordingly, it includes a housing 12, in which a vaned rotor 14 is arranged that rotates about a rotational axis in a manner known per se. To increase the efficiency of turbomachine 10, there are arranged, in an annular manner about the rotational axis of the rotor, variable guide vanes 16 that are each constructed in an adjustable or rotatable manner about a radial axis A to modify the inflow of downstream rotor 14 depending on an operating point of turbomachine 10. Guide vanes 16 are each mounted rotatably on both ends on housing 12. Radially above its vane blade 18, each guide vane 16 thereby has a blade plate 20 and a pivot pin 22 connecting to it. In this case, pivot pin 22 is mounted via two roller bearings 24 according to the invention rotatably arranged above each other on housing 12. It shall thereby be emphasized that both the number as well as the arrangement of roller bearings 24 are only examples. To secure the position of pivot pin 22, housing 12 has a cover 26 to which is arranged a shaft seal 28 constructed in this case as a stuffing box. As one can see particularly in FIG. 2, which depicts a magnified view of detail II shown in FIG. 1, roller bearings 24 include in the depicted embodiment a shared bearing housing 30. It is understood that each roller bearing 24 may in principle have a separate bearing housing 30 or that three or more roller bearings 24 may be arranged in a shared bearing housing 30. A basically optional insulation element 32, which surrounds bearing housing 30 on its exterior circumference for heat insulation purposes, is thereby assigned to bearing housing 30.

Figure 2:
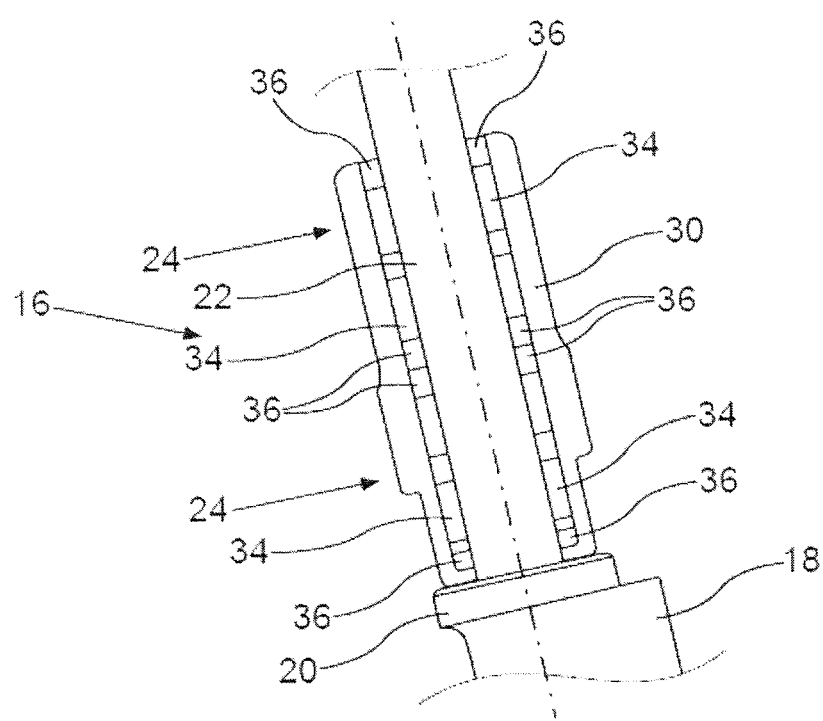
FIG. 2 depicts a magnified view of detail II shown in FIG. 1.
Figure 3:
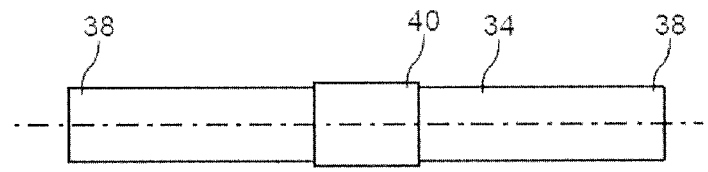
FIG. 3 depicts a schematic side view of a needle of a roller bearing according to the present invention.

As one can also see in FIG. 2, each roller bearing 24 has multiple radially elastic needles 34, which are guided in the shape of a needle collar 46 (see FIG. 6) into a respective cage 36 of shared bearing housing 30. For more detailed clarification purposes, FIG. 3 depicts a schematic side view of a needle 34 in a no-load state. FIG. 3 will be explained below also taking into consideration FIGS. 4 and 5, wherein FIG. 4 depicts a schematic side view of needle 34 as well as a section of bearing housing 30, while FIG. 5 depicts a schematic side view of needle 34, a section of bearing housing 30, and cage 36 of roller bearing 24 according to the invention.

One can see that every needle 34 is constructed in a rotation-symmetrical manner and has two opposing end regions 38 as well as a roller region 40 arranged between end regions 38 and constructed in a cross-sectionally thickened manner. Roller region 40 is arranged, in this case, in the center of needle 34 and constructed in a cylindrical manner. An axial length of the roller region thereby amounts to approximately 20% of the total length of the needle, while an average cross-sectional thickness of the roller region amounts to approximately 110% of the average cross-sectional thickness of needle 34 or approximately 10% thicker than the rest of needle 34.

Figure 4:
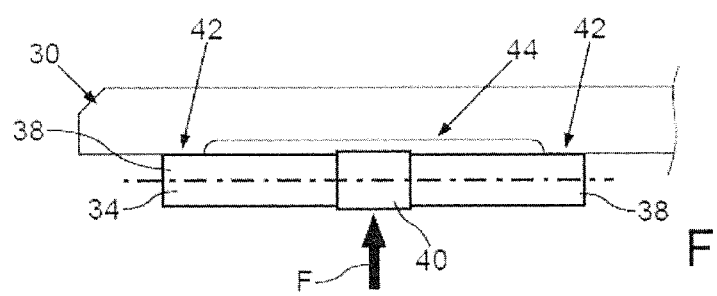
FIG. 4 depicts a schematic side view of the needles and a section of a bearing housing of the roller bearing according to the invention.
Figure 5:
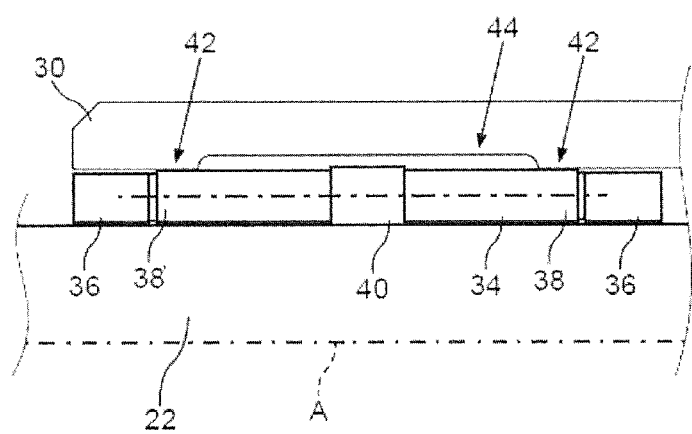
FIG. 5 depicts a schematic side view of the needle and a section of the bearing housing and a cage of the roller bearing according to the present invention.

As one can see in FIGS. 4 and 5, end regions 38 roll off at associated raceways 42 of bearing housing 30, while roller region 40 is arranged in the region of an associated groove 44 of bearing housing 30. The shape and depth of groove 44 as well as the cross-sectional thickness of roller region 40 thereby define the maximum bending of needle 34. In doing so, roller region 40 can, based on the schematically indicated force F as well as any length changes of needle 34, move into groove 44 until it contacts bearing housing 30 or until end regions 38 of needle 34 contact pivot pin 22 or roll off at pivot pin 22 due to the deflection of needle 34. By the elastic yielding of needle 34, an almost play-free mounting of guide vanes 16 is ensured in all operating points of turbomachine 10 and also during transient transitions, in which particularly large temperature differences occur. Cage 36, visible in FIGS. 5 and 6, thereby limits the relative motion of needle 34 in relation to bearing housing 30. With the help of roller bearing 24, the creation of asymmetric leakage gaps in shaft seal 28 is avoided, whereby their leak-tightness is also improved. In addition, extremely low bearing wear without "seizing" is ensured by the primarily occurring roll movement of needles 34. Roller bearing 24 according to the invention therefore allows a tighter and more durable mounting of guide vanes 16 than previous solutions.

Figure 6:
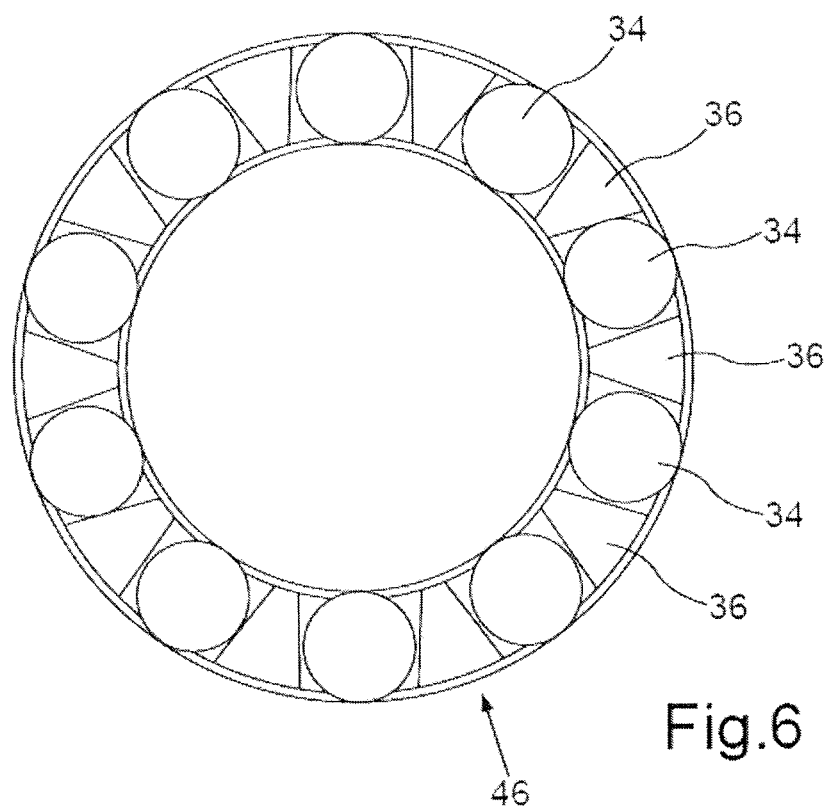
FIG. 6 depicts a schematic top view of a needle collar of the roller bearing according to the present invention.

FIG. 6 depicts a schematic top view to needles 34 of roller bearing 24 according to the invention, the needles being arranged in the shape of a needle collar 46 and secured in position by cage 36, wherein in the depicted example ten needles 34 are provided per roller bearing 24. Depending on the intended use and size of roller bearing 24, naturally more or fewer needles 34 may be provided.

LIST OF REFERENCE CHARACTERS

10 Turbomachine
12 Housing
14 Rotor
16 Guide vane
18 Vane blade
20 Vane plate
22 Pivot pin
24 Roller bearing
26 Cover
28 Shaft seal
30 Bearing housing
32 Insulation element
34 Needle
36 Cage
38 End region
40 Roller region
42 Raceway
44 Groove
46 Needle collar The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A roller bearing for arranging on a pivot pin of a variable guide vane of a turbomachine, comprising:
   a radially elastic needle which has two opposing end regions and a roller region arranged between the two end regions, wherein the roller region has an average cross-sectional thickness that is greater than an average cross-sectional thickness of the needle; and
   a bearing housing;
   wherein the two end regions roll off at respective raceways of the bearing housing and wherein the roller region is disposed in a region of a groove of the bearing housing.

2. The roller bearing according to claim 1, wherein the roller region does not contact the bearing housing when the needle is in a no-load state.

3. The roller bearing according to claim 1, wherein the roller region is disposed in a center of the needle.

4. The roller bearing according to claim 1, wherein an axial length of the roller region is between 5% and 50% of a total length of the needle and/or the average cross-sectional thickness of the roller region is between 105% and 180% of the average cross-sectional thickness of the needle.

5. The roller bearing according to claim 1, wherein the roller region has an essentially cylindrical or spherical shape.

6. The roller bearing according to claim 1, wherein the needle has a second roller region and wherein the roller region is spaced apart from the second roller region.

7. The roller bearing according to claim 1, wherein the bearing housing includes a cage, wherein the needle is guided in the cage, and wherein the cage limits a relative movement of the needle in relation to the bearing housing.

8. The roller bearing according to claim 1, further comprising an insulating element and wherein the insulating element surrounds the bearing housing.

9. The roller bearing according to claim 1, further comprising a plurality of needles disposed in the bearing housing in a ring-shape.

10. A guide vane of a turbomachine, comprising:
a pivot pin; and
a roller bearing according to claim 1, wherein the roller bearing is disposed on the pivot pin.

11. A housing for a turbomachine, comprising:
a variable guide vane which has a pivot pin that is disposed on the housing by a roller bearing according to claim 1.

12. The housing according to claim 11, further comprising a second roller bearing, wherein the roller bearing and the second roller bearing are disposed adjacent to each other in an axial direction of the pivot pin.

13. The housing according to claim 11, wherein the pivot pin is sealed by a shaft seal in relation to the housing.

14. The housing according to claim 11, further comprising a second variable guide vane and wherein the variable guide vane and the second variable guide vane are arranged as a guide vane cascade.

15. A turbomachine, comprising:
a guide vane including a pivot pin and a roller bearing according to claim 1, wherein the roller bearing is disposed on the pivot pin; and
a housing, wherein the pivot pin is disposed on the housing by the roller bearing.

* * * * *